United States Patent [19]
Rovner

[11] 3,835,375
[45] Sept. 10, 1974

[54] APPARATUS FOR DETERMINING THE DIRECTION OF A MAGNETIC FIELD RELATIVE TO A REFERENCE DIRECTION BY SYNCHRONOUSLY SCANNING THE FIELD AND A MEMORY

[76] Inventor: Leopold Rovner, 2201 Acacia Park Dr., Cleveland, Ohio 44124

[22] Filed: July 21, 1972

[21] Appl. No.: 274,069

Related U.S. Application Data
[63] Continuation-in-part of Ser. No. 219,725, Jan. 21, 1972.

[52] U.S. Cl. .............................. 324/43 R, 33/361
[51] Int. Cl. .......................................... G01r 33/04
[58] Field of Search ...... 324/43 R, 47; 33/355, 360, 33/361, 362, 363; 343/120

[56] References Cited
UNITED STATES PATENTS

| | | | |
|---|---|---|---|
| 1,796,295 | 3/1931 | Loth | 324/43 R |
| 1,939,690 | 12/1933 | Gunn | 33/362 |
| 2,130,912 | 9/1938 | Tolson | 33/360 |
| 2,389,146 | 11/1945 | Fragola et al. | 324/43 R |
| 2,632,959 | 3/1953 | Boucher | 33/363 Q |
| 2,770,773 | 11/1956 | Cooley | 324/37 |
| 3,264,554 | 8/1966 | Hayner et al. | 33/363 Q |
| 3,634,946 | 1/1972 | Star | 33/356 |

*Primary Examiner*—Robert J. Corcoran
*Attorney, Agent, or Firm*—Woodling, Krost, Granger & Rust

[57] ABSTRACT

An apparatus to detect the direction of an external magnetic field is disclosed incorporating a flux gate magnetometer having a plurality of sensing coil arrays. A scanner sequentially connects each sensing array to a detector to determine the sensing coil which is in alignment with the external magnetic field. A memory device having a plurality of memory units is connected to the scanner to transfer the content of a memory unit to an indicator upon detection of said alignment. The indicator numerically displays the content of the memory unit which is the angular direction of the external field relative to a marker direction.

17 Claims, 12 Drawing Figures

APPARATUS FOR DETERMINING THE DIRECTION OF A MAGNETIC FIELD RELATIVE TO A REFERENCE DIRECTION BY SYNCHRONOUSLY SCANNING THE FIELD AND A MEMORY

This is a Continuation-In-Part of my prior application Ser. No. 219,725, filed Jan. 21, 1972.

BACKGROUND OF THE INVENTION

This invention relates to devices for detecting an external magnetic field and more specifically, to a device incorporating sensing means in conjunction with memory means to detect a marker direction relative to that of an external magnetic flux.

A device for detecting the direction of an external magnetic field has usually been referred to as a compass due to the fact that the magnetic field of the Earth is a particular one of general interest. The compass was one of the earlier technical discoveries of man and generally included suspending a magnetic material such that the device incorporating this material would align itself relative to the external magnetic field. The compass has been improved for centuries but this basic principle of operation has been unchanged.

With the advent of electricity into the magnetic field detection art, sensing coils and Hall effect devices were introduced to increase sensitivity. These improved devices still had some basic mechanical disadvantages of the most primitive compasses. The magnetic field detection apparatuses incorporating sensing coils and Hall effect devices were either limited to the number of directions to which they were sensitive, or they contained mechanically moving sensing coils or moving indicator means such as selsyns and the like. The requirement of mechanically moving parts in modern directional magnetic field detection apparatuses has generally remained since the first compasses were used by primitive man. This requirement of moving parts makes the apparatus sensitive to accelerations, vibrations and to the force of gravity. In addition, because of friction, the moving parts have to be suspended on jeweled surfaces in order to allow free motion of the moving parts. In order to design a magnetic field detection apparatus which is both sensitive to the direction of external magnetic fields and insensitive to vibrations, the moving parts must be freely suspended and damped. A damping of such moving parts slows the response making the apparatus inadequate for some applications. In an age of supersonic jet aircraft and space shuttles, the high speed, very short period response time of a directional magnetic field detection apparatus is critical.

Therefore, one object of this invention is to produce a magnetic field detection apparatus having no moving parts.

Another object of this invention is to produce a magnetic field detection apparatus which is insensitive to accelerations and vibration and has effectively instant response time.

Another object of this invention is to produce a magnetic field detection apparatus which is sensitive to all directions in a given plane.

Another object of this invention is to produce a magnetic field detection apparatus capable of producing an instantaneous display of a marker direction relative to the direction of an observed external magnetic field.

Another object of this invention is to produce a magnetic field detection apparatus with the capability of time averaging a marker direction output without decreasing the response time of the apparatus.

Another object of the invention is to provide a plurality of sensing coils arranged in different azimuthal directions and scanned in sequence to determine the direction of the Earth's magnetic field.

SUMMARY OF THE INVENTION

The invention may be incorporated in an apparatus to determine a marker direction relative to the direction of an external magnetic flux, comprising in combination, sensor means detecting the external magnetic flux, memory means comprising a plurality of memory unit means each representative of an angular direction relative to the marker direction, and means establishing cooperation between said sensor means and said memory means to obtain from said memory means a representation of the angular direction between the external magnetic flux and the marker direction upon said sensor means detecting a predetermined value of said external magnetic flux.

Other objects and a fuller understanding of the invention may be had by referring to the following description and claims, taken in conjunction with the accompanying drawing.

DESCRIPTION OF THE PREFERRED EMBODIMENT

Figure 1:
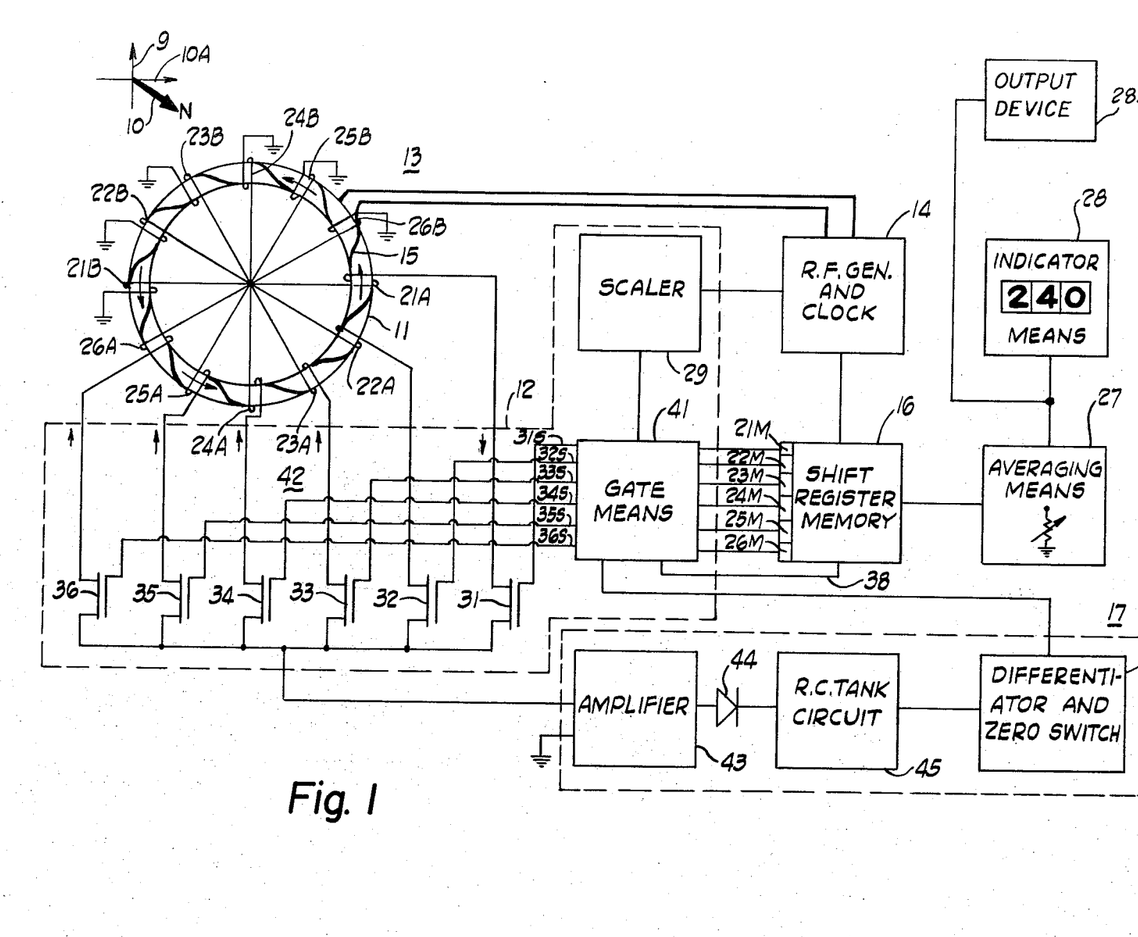
FIG. 1 illustrates a simplified magnetic field detection apparatus in accordance with the disclosed invention.

FIG. 1 illustrates a simplified embodiment of an apparatus to determine a marker direction shown by the arrow 9 relative to the direction of an external magnetic flux shown by the arrow 10. The external magnetic flux 10 can be any magnetic field but in this embodiment the magnetic flux is illustrated as the magnetic field about the Earth with arrow 10 pointing in the northward direction. The apparatus includes core means 11 shown as an annular ring which is located within the external magnetic flux 10. The apparatus also includes a radio frequency generator 14 connected to a primary winding 15 wound about the core means 11 to induce a varying magnetic flux in the core means 11. The frequency of the RF generator 14 can range between 200 KHz and 2 MHz. The varying magnetic flux established with the core means 11 is established parallel to the circumference of the core means whereas the external magnetic flux 10 is established across the core means 11. The core means 11 can be constructed such that the direction parallel to the circumference is easy to saturate with a small magnitude of magnetic flux whereas the direction perpendicular to the circumference is hard to saturate and requires a large magnitude of magnetic flux to saturate.

The apparatus also includes a plurality of sensing means 21–26 each having a sensing output in response to the flux in the core means 11. The sensing means 21–26 are shown as sensing coil means each having a first and a second coil portion means 21A through 26A and 21B through 26B, respectively. The first and second coil portion means are illustrated as being wound in opposition to one another such that the current produced by the varying magnetic flux within the core means 11 in the first coil portion means is canceled by the current produced in the second coil portion means by the varying magnetic flux. The core means 11 is constructed of a magnetic material such as permalloy and the like which is easily saturated. The RF generator 14 is adjusted to drive the core means 11 into saturation during each half cycle of the RF voltage. For example, at a given instant the varying magnetic flux within the core means 11 is travelling downwardly through the first coil portion means 25A, whereas the magnetic flux is travelling upwardly through the second coil portion means 25B. The external magnetic flux 10 adds to the varying magnetic flux through the first coil portion means 25A but subtracts from the varying magnetic flux through the second coil portion means 25B. Therefore, the magnetic flux through the first coil portion means 25A will saturate before the magnetic flux through the second coil portion means 25B in response to the external magnetic flux 10. When the magnetic flux through the first coil portion means 25A is saturated, the first coil portion means 25A produces no output whereas the second coil portion means 25B is still in the process of reaching saturation and is still producing an output. Therefore, the sum of the first and second coil portion means 25A and 25B no longer cancels but produces an output which is proportional to the strength of the external magnetic flux 10. For a fuller discussion, the reader is invited to review R.D. Wyckoff: "Gulf Airborne Magnetometer," Geophysics 13 182–208, 1948.

Figure 2:
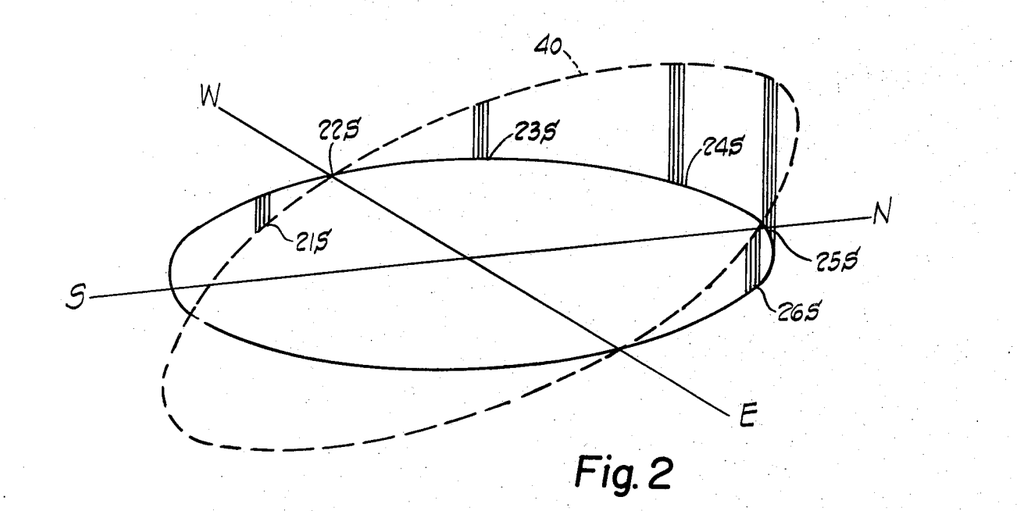
FIG. 2 illustrates the output of the sensing means as a function of an external magnetic field.

FIG. 2 shows the outputs of the sensing means 21–26 of FIG. 1 in relation to the direction of the external magnetic flux 10. The sensing means 25 which is wound about an axis parallel to the external magnetic flux 10 has the maximum positive signal output as illustrated by the output pulses 25S. The sensing means 24 and 26 have reduced outputs since only a component of the external magnetic flux 10 affects the saturation of the core means 11 at the locations of the respective coil portion means. The output 23S of the sensing means 23 is reduced relative to the output 24S of the sensing means 24 since the component of the external magnetic field 10 aiding and hindering saturation of the core means 11 at the first and second coil portion means 23A and 23B, respectively, is reduced. The sensing means 22 has a zero output 22S since the external magnetic flux does not aid in saturation. The output 21S of the sensing means 21 is negative relative to the output signals 23S–26S. This change in polarity is illustrated in FIG. 1 by the winding directions of the sensing means 21–26 and the arrows indicating current flow.

The core means 11 shown in FIG. 1 has only six sensing means which are able to interrogate only six directions. Only six directions were interrogated on FIG. 1 for the sake of simplicity but in actual practice many more directions are interrogated such as 360 in order to determine more accurately the direction of external magnetic field. A sufficient number of sensing means to enable interrogation to accuracies of degrees or fractions thereof would be more appropriate for actual operation. The resultant output of a large number of sensing means is illustrated by locus 40 in FIG. 2.

The apparatus shown in FIG. 1 also includes scanner means 12 and detector means 17. The scanner means 12 applies each of the outputs of the sensing means 21–26 to the detector means 17. The detector means 17 includes an amplifier 43 connected to an R.C. tank circuit 45 by a rectifier 44. The scanner means 12 sequentially connects each of the sensing means to the detector means 17. The scanner means is shown as including scaler means 29, gate means 41 and first switch means 42. The first switch means 42 is shown as an array of solid state switching devices 31–36 which sequentially connect the sensing means 21-26 to the amplifier 43 of the detector means 17. The solid state switching devices 31–36 can be FET or MOS-FET transistors wherein the channels thereof are interconnecting the amplifier 43 and each of the sensing means 21–26. The gate of each of the solid state switching devices 31–36 is connected to the gate means 41. The scaler means 29 is connected to the RF generator 14 and reduces the generated frequency to produce an output which is applied to the gate means 41 to control the progression rate of the gate means 41. For example, when the scaler means 29 produces a pulse to the gate means 41, a gate signal is generated at terminal 31S and applied to switch device 31. The switch device 31 turns on, interconnecting the sensing means 21 to the amplifier 43. The next pulse from the scaler means 29 indexes the gate means 41 producing a gate signal at terminal 32S turning on switch device 32 hereby interconnecting the sensing means 22 to the amplifier 43. Another pulse from the scaler means 29 produces a gate signal 33S which interconnects the sensing means 23 to the amplifier 43. The connection sequence continues until switch device 36 has been energized whereat the sequence begins again with switch device 31.

Figure 3A:
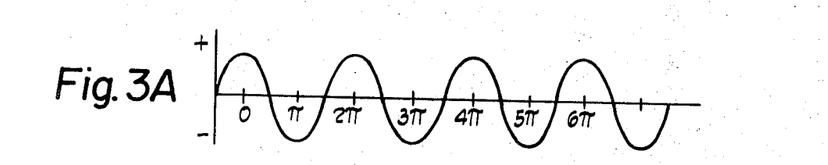
FIGS. 3A, B and C illustrate waveforms present at various points in FIG. 1.
Figure 3B:
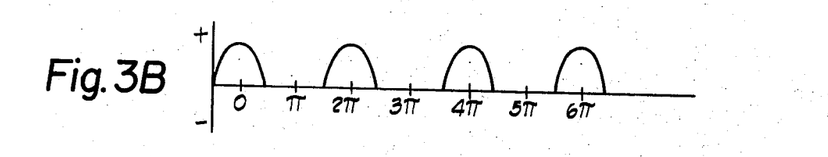
Figure 3C:
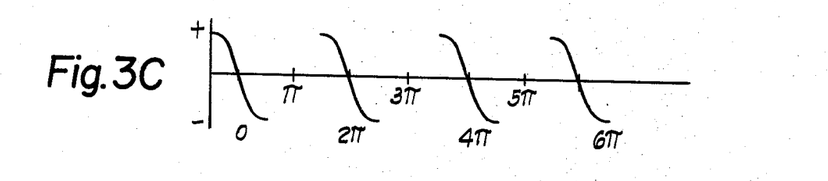

FIG. 3A illustrates the pulse envelope applied to the amplifier 43 from sensing means having a resultant output as shown by locus 40 in FIG. 2. The maximum pulses will occur when a sensing means is wound about an axis in the direction of the external magnetic flux; e.g., pulses 25S in FIG. 2, from sensing means 25. The output of amplifier 43 is rectified by a rectifier 44 and the output thereof is channeled into an RC tank circuit 45. The output of the RC tank circuit 45 is shown in FIG. 3B. The frequency of the RF generator 14 and the scaler means 29 can be selected such that a plurality of output pulses from each sensing means is applied to the amplifier 43 during the time of gating of the respective switch devices. In this arrangement, the RC tank circuit 45 averages the amplitude of the plurality of pulses as shown in FIG. 2. The output of the RC tank circuit 45 is applied to means which is responsive to the rate of change of the RC tank circuit output. The detector means 17 is shown to include a differentiator and a zero switch stage 51. The differentiator has an output shown in FIG. 3C. When the output of the differentiator reaches a zero level indicating a maximum of the output emanating from the RC tank circuit 45, the zero switch within stage 51 triggers. The differentiator and zero switch can be discrete devices or can be combined into a single stage such as a peak detector and the like to detect a given value of the external magnetic flux.

The differentiator and zero switch 51 is connected to the gate means 41 to produce a signal to the gate means 41 upon the detector means 17 detecting a given or predetermined value of the external magnetic flux 10. FIG. 1 also includes shift register memory means 16 which contains a plurality of memory unit means each representative of an angular direction relative to the marker direction 9. For example, the shift register memory in FIG. 1 contains six memory units 21M to 26M corresponding to the six sensing coil means 21–26. The memory means 16 is connected to the gate means 41 by a plurality of connectors each of which interconnects a particular memory unit 21M to 26M with one of the gates of the gate means 41. Thus, the memory units 21M–26M are connected to the same gate circuit controls the signal 31S–36S, respectively. The memory means 16 is programmed with signals representative of angular directions relative to the marker direction 9 and corresponding to the respective sensing coil means. For example, the content of memory units 21M–26M are respectively 0°, 330°, 300°, 270°, 240° and 210°. The memory units 21M–26M may store data in the form of a continuous stream of charge units which shift from memory unit 26M in sequence to memory unit 21M each time a pulse from the R. F. generator and clock 14 energizes the shift register memory 16. In practice, the memory may contain 360 memory units e.g., which will provide a constant stream of charge carriers through these 360 memory units. Upon an output from the detector means 17 to the gate means 41, the gate means 41 applies a signal to a particular memory unit corresponding to the signal applied to the switching devices of the first switch means 42. This signal to the memory 16 blanks out charge input to the memory 16 while allowing the signal from Clock 14 to produce charge transfer along the shift register memory units 26M–21M. Consequently, no new charge carriers are added to the shift register memory units 26M–21M, but the remaining charges in the shift register memory units 26M–21M are directed to the averaging means 27. The signal from the gate means 41 opens an output gate in the shift register memory 16 for the shift register change pulses to go to the averaging means 27. With the drive of the RF generator 14 used as a clock, the shift register memory means 16 releases the content of the addressed memory unit into the averaging means 27. If the RF generator is operating at a frequency of 2 MHz., and the gate means stepped scanning sequence is operating at a stepping frequency of 20,000 pulses per second, then the output of the shift register memory means 16 can be released within the order of 100 microseconds after scanning North, which is practically instantaneously for visual readout. Upon completion of the release of the content of the memory means 16, a signal is transmitted to the gate means 41 by conductor 38 to turn the charge input blanking signal off to the memory means 16. Concomitantly, the shift register memory is reloaded to await the next pulse from the gate means 41. An example of the operation of the shift register memory 16 may be as follows: memory unit 26M represents 210°, 25M represents 240°, 24M represents 270°, 23M represents 300°, 22M represents 330° and 21M represents 0° or 360°. Generally, 360 memory units are required and, therefore, 209 memory units (not shown) will precede memory unit 26M. As the scanner means 42 scans the sensing coils, the R.F. generator and clock 14 provides transfer pulses to the shift register memory 16. A charge input internal to the memory 16 provides charge to the memory units so that a constant stream of charge carriers will progress from the memory units (not shown) preceding memory unit 26M through memory unit 26M to memory unit 21M. The charge transfer sequence continues until one of the gates 21M–26M is energized, which occurs upon an output from the detector 17 connected to the gate means 41. Assuming, for example, memory unit 25M is energized, then, the charge input to the memory units ceases, and the total number of charge units preceding memory unit 25M are transferred to the averaging means 27 with the R. F. generator and clock 14 providing the charge transfer pulses to transfer charges to the averaging means 27. Thus, the total number of charge units which will be delivered to the averaging means will be 240 as indicated by the indicator means 28. Upon completion of the transfer to the averaging means, the charge stream is restored by a circuit internal to the shift register memory 16 to again establish the continuous stream of charge carriers from the memory units preceding memory unit 26M to memory unit 21M. Assuming, for example, that memory 23M is energized, then the charge input again ceases and the R. F. generator and clock 14 will transfer all charges retained by all of the memory units preceding the memory unit 23M. This will result in a total of 300 pulses transferred to the averaging means 27. A discussion of the shift register memory is to be found in the report "Bucket Brigade Devices Pass From Principle to Prototype," Electronics, Feb. 28, 1972 et sequetur.

Each of the sensing coil means 21–26 is associated with a memory unit 21M–26M which memory unit corresponds to an angle relative to the marker direction 9. If a given coil detects a maximum north direction, then the corresponding memory unit will be released to the averaging means 27. If the scanning sequence energizes the switch device 35 by a signal 35S, the sensing means 25 will be energized which is in alignment with the external magnetic flux 10 to produce a maximum output. When this maximum is traversed, the detector means 17 will produce a pulse to the gate means 41. The gate means 41 will energize memory unit 25M to release the content thereof to the averaging means 27. The memory unit means 25M will contain a signal representative of 240° as shown by the indicator means 28. If, for example, the external magnetic flux is in the direction indicated by the arrow 10A, then the maximum signal from the sensing coil means will be produced by sensing coil 24. The detector means 17 will produce an output to the gate means 41 which energizes the memory unit 24M. Memory unit 24M contains a signal representative of 270° which is the direction of th external magnetic field relative to the marker direction 9. The output of the memory means is entered into an averaging means 27 which can either be a digital or analog device wherein the output of the memory means is time averaged over a selected period of time before being displayed by indicator means 28. The averaging means 27 controls the response of the indicator means 28 and is shown able to varying the span of the time over which angle signals are averaged prior to release of number data into the indicator means 28. The indicator means 28 is illustrated as a digital indicating means but can be any type of indicator suitable for a given use. In addition, the output of the averaging means can be used for control of an output device 28A such as an automatic pilot and the like.

The detector means 17 illustrated in FIG. 1 is responsive to maximum positive signal of the RC tank circuit 45 which corresponds to the direction of the external magnetic flux. However, the detector means 17 can be replaced by a device sensitive to a given slope of a given value or a voltage rising or voltage falling zero point of the output of the RC tank circuit 45. Accordingly, the memory means would have to be adjusted for output at a point other than the positive direction of the external magnetic flux. The selected marker direction illustrated by arrow 9 is programmed into memory means 16. The selection of the marker direction is completely arbitrary in that the memory means can be programmed in a multitude of ways. However, the marker direction 9 should correspond to some physically meaningful direction such as the axis or lubberline of a vehicle or craft, or a filar line in a surveyor's transit, or the optical axes of a binocular set, and the like.

Figure 4:
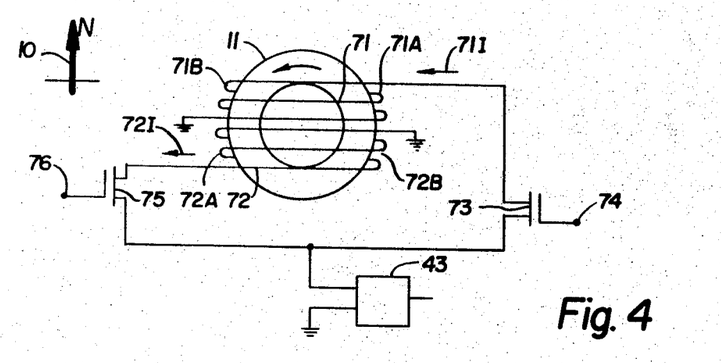
FIG. 4 illustrates sensing means suitable for use with the apparatuses shown in FIGS. 1, 7 and 9.

FIG. 4 illustrates core means 11 and sensing means 71 and 72. The sensing means 71 and 72 are shown as sensing coil means wound opposite to one another and able to detect directions 180° relative to each other. Each coil has a first and second coil portion means 71A, 72A and 71B, 72B, respectively. When the internal magnetic flux is travelling in a direction indicated by the arrow in the core means 11 and the external magnetic flux is pointing in a direction indicated by the arrow 10, then the right half of the core means 11 will saturate before the left half causing a current output in the sensing coil means 71 and 72 in accordance with the arrows 71I and 72I, respectively. The sensing means 71 is connected to the amplifier 43 by switch means 73 controlled by a gate 74 whereas the sensing means 72 is connected to the amplifier 43 by switch means 75 having gate 76. A gate signal from the scanner means 12 shown in FIGS. 1 and 7 will energize the gate of switch means 73 to apply the output of sensing means 71 to the amplifier 43. At a suitable later time, the scanner means will energize gate 76 of switch means 75 to apply the output of sensing means 72 to amplifier 43. The embodiment shown in FIG. 1 was able to interrogate only six directions each coil interrogating a single direction. Therefore, only half of 12 sensing means are illustrated in FIG. 1 for the sake of simplicity. In actual practice each sensing means, for example, sensing means 21 would be replaced by a paired sensing means as shown in FIG. 4. The gate means would then have 12 outputs to scan in 12 directions throughout 360° in 30° increments. If a greater angular resolution is desired, then additional sensing means may be added. For each of the two directions along a given line, a pair of sensing means and switch means must be used as illustrated in FIG. 4.

Figure 5:
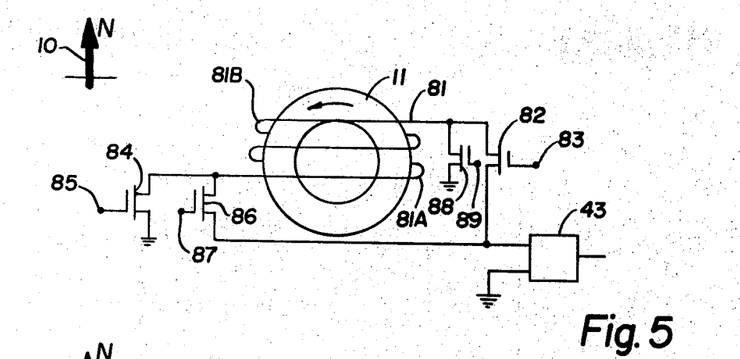
FIG. 5 illustrates a variation of the sensing means which is suitable for use with the apparatuses shown in FIGS. 1, 7 and 9.

FIG. 5 shows a single sensing means 81 wound around core means 11 and having a first and a second coil portion means 81A and 81B, respectively. A gate signal from the scanner means 12 is applied to both the gates 83 and 85 of switch means 82 and 84 to connect the sensing means 81 to the amplifier 43 in a manner similar to the sensing means 71 shown in FIG. 4. Subsequently, a gating pulse applied to both the gates 87 and 89 of switch means 86 and 88 connects the sensing means 81 to the amplifier 43 in a manner similar to the sensing means 72 shown in FIG. 4. Therefore, by the addition of two switch means in FIG. 5, only one-half of the number of coils is required in comparison with FIG. 4 since the sensing means 81 is electrically inverted.

Figure 6:
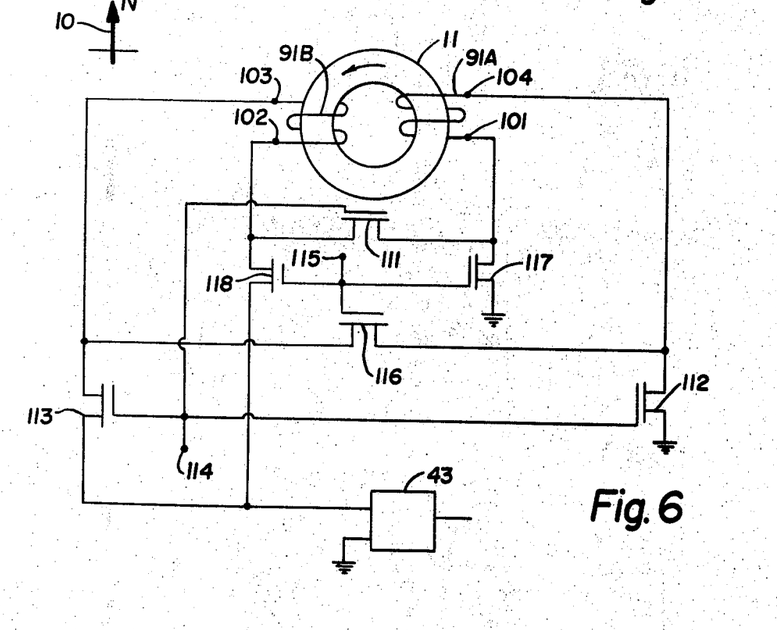
FIG. 6 shows still another variation of the sensing means which is suitable for use with the apparatuses shown in FIGS. 1, 7 and 9.

FIG. 6 illustrates an annular core means 11 similar to the core means 11 shown in FIG. 1 and sensing means 91 having a first and a second coil portion means 91A and 91B which are similar to the coil portion means 21A and 21B shown in FIG. 1. However, in FIG. 1 the first coil portion means 21A is directly interconnected with the second coil portion means 22B. The first and second coil portion means 91A and 91B each has a first and a second terminal 101–104 and 102–103. When a gate signal is applied to the switch means 111-112-113 through a common terminal point 114 from the gate means 41, terminals 101 and 102 are interconnected whereas terminals 103 and 104 are connected to the input of amplifier 43. When a subsequent gating signal is applied to terminal 115, the switch means 116-117-118 interconnect terminals 103 and 104 and apply terminals 101 and 102 to amplifier 43. Therefore, the scanner means 12 of FIG. 1 sequentially interconnects one of the terminals of each of the first and second coil portion means and connects the other of the terminals of each of the first and second coil portion means to the amplifier means 43. The scanner means subsequently interconnects the other terminals of each of the first and second coil portion means and connects said one of the terminals of each of the first and second coil portion means to the amplifier means 43. In this embodiment the addition of five switch means over the one switch means required in FIG. 1 enables the sensing means 91 to interpret two directions eliminating half of the coil requirements of the embodiment shown in FIG. 1. The various types of sensing coil means shown in FIGS. 4–6 can be used with either an annulus or a disc-type core means. The annulus can be a toroid or a ring or the like. The advantages of FIGS. 5 and 6 include a reduction of one-half of the coil requirements of FIGS. 1 and 4. However, the switching circuits in FIGS. 5 and 6 are more complex.

Figures 7, 7A:
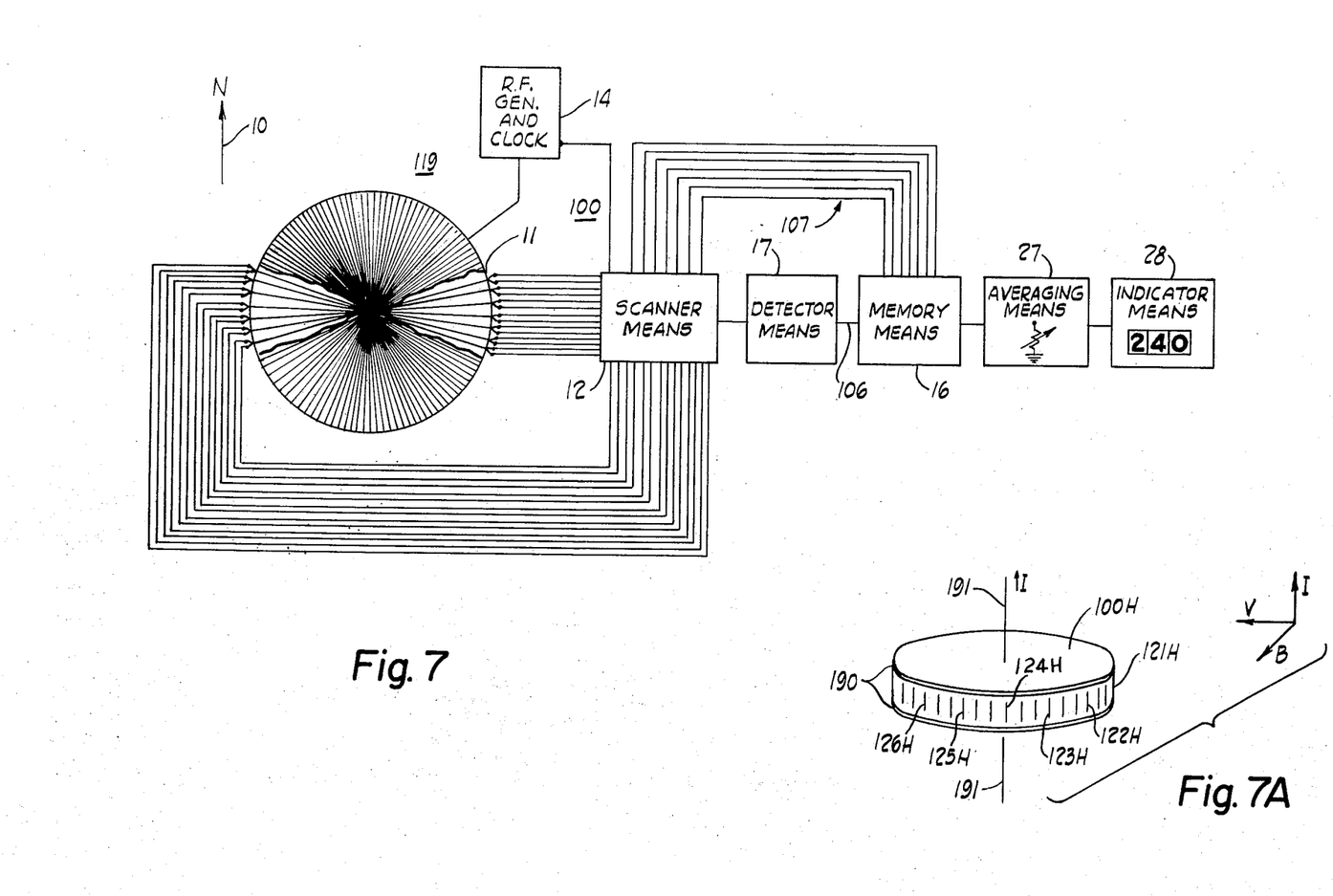
FIG. 7 illustrates the preferred embodiment of the present invention.
FIG. 7A shows still another variation of the sensing means which is suitable for use with the apparatuses shown in FIGS. 1, 7 and 9.

FIG. 7 is the preferred embodiment of the present invention including sensor means 100 to detect the external magnetic flux 10. The sensor means 100 can be any type of magnetic flux sensor such as Hall effect devices and the like. The sensor means 100 is shown to include the sensing coil means 119, the core means 11, the RF generator means 14, the scanner means 12 and the detector means 17. The preferred embodiment includes memory means 16 comprising a plurality of memory unit means each representative of an angular direction relative to the marker direction. Cooperation between the sensor means 100 and the memory means 16 is established by connections 106 and 107 (as a group) to obtain from the memory means a representation of the angular direction between the external magnetic flux and the marker direction upon detection of a given value of the external magnetic flux by the sensor means 100. The RF generator 14 establishes a magnetic flux in the core means 11. The preferred embodiment also shows a plurality of sensing coil means 119 connected to the scanner means 12 each having an output in response to the flux in the core means 11. The scanner means 12 sequentially applies the sensing outputs of each of the sensing coil means 119 to the detector means 17. The scanner means 12 cooperates with the memory means 16 by conductors 107 to address the corresponding memory unit of the memory means 16. The detector means 17 in response to the output of the sensing coil means 119 energizes the memory means 16 to obtain therefrom the signal of the addressed memory unit. An output of the address memory unit is directed into the averaging means 27 each time the sensor means 100 detects the appropriate external magnetic flux. Since the content of the memory units embodies a representation of the angle of the external magnetic flux relative to the marker direction, there is no required sensing or detection of the marker direction. The marker direction is programmed into the memory means 16. The averaging means 27 time averages the memory means output for a number of scan cycles before transferring the averaged marker direction relative to the external magnetic flux to the indicator means 28. The large number of sensing coil means 119 shown in FIG. 7 in part determines the quality of angular resolution of the apparatus. If an extremely high angular resolution is required, then several sensing means per degree might be used whereas in general applications one sensing means per many degrees may be sufficient. In order to simplify the drawing, not all of the sensing coil means 119 are shown connected in FIG. 7. The detector means 17 may include a device for interpolating when the apparatus is being operated with a relatively few number of sensing means. For example, an apparatus using 12 sensing means would apply a signal to the detector means 17 corresponding to every 15° of scan. The detector means 17 would interpolate the information received every 15° and determine the magnetic field direction in units of degrees or smaller. All of these variations are within the breadth of the described invention.

FIG. 7A illustrates a variation of the sensor means 100 shown in FIG. 7. The sensor means 100H shown in FIG. 7A is a Hall effect device to sense the external magnetic field. The sensor means 100H is shown as a disc with conductive surfaces 190 on each side of the disc and sensing contacts 121H–126H on the edge of the Hall effect disc. For currently available Hall effect crystals, this sensor means 100H would be suitable for magnetic fields stronger than that of the Earth. A conductor 191 connects to the conductive surfaces 190 to produce a uniform current density through the device from one side to the other. The presence of an external magnetic field B perpendicular to the direction of current flow I indicated by the vector diagram will produce voltages V on the sensing contacts 121H–126H and a maximum of such voltages will occur 90° from the direction of the external magnetic flux. Each of the contacts 121H–126H is connected to the scanner means 12 as shown in FIG. 7 to detect the external magnetic field. Only six contacts have been labeled in FIG. 7A for simplicity and to correspond to the sensing coil means shown in FIGS. 1 and 9 but the number of sensing contacts incorporated is determined by the angular resolution desired.

Figure 8:
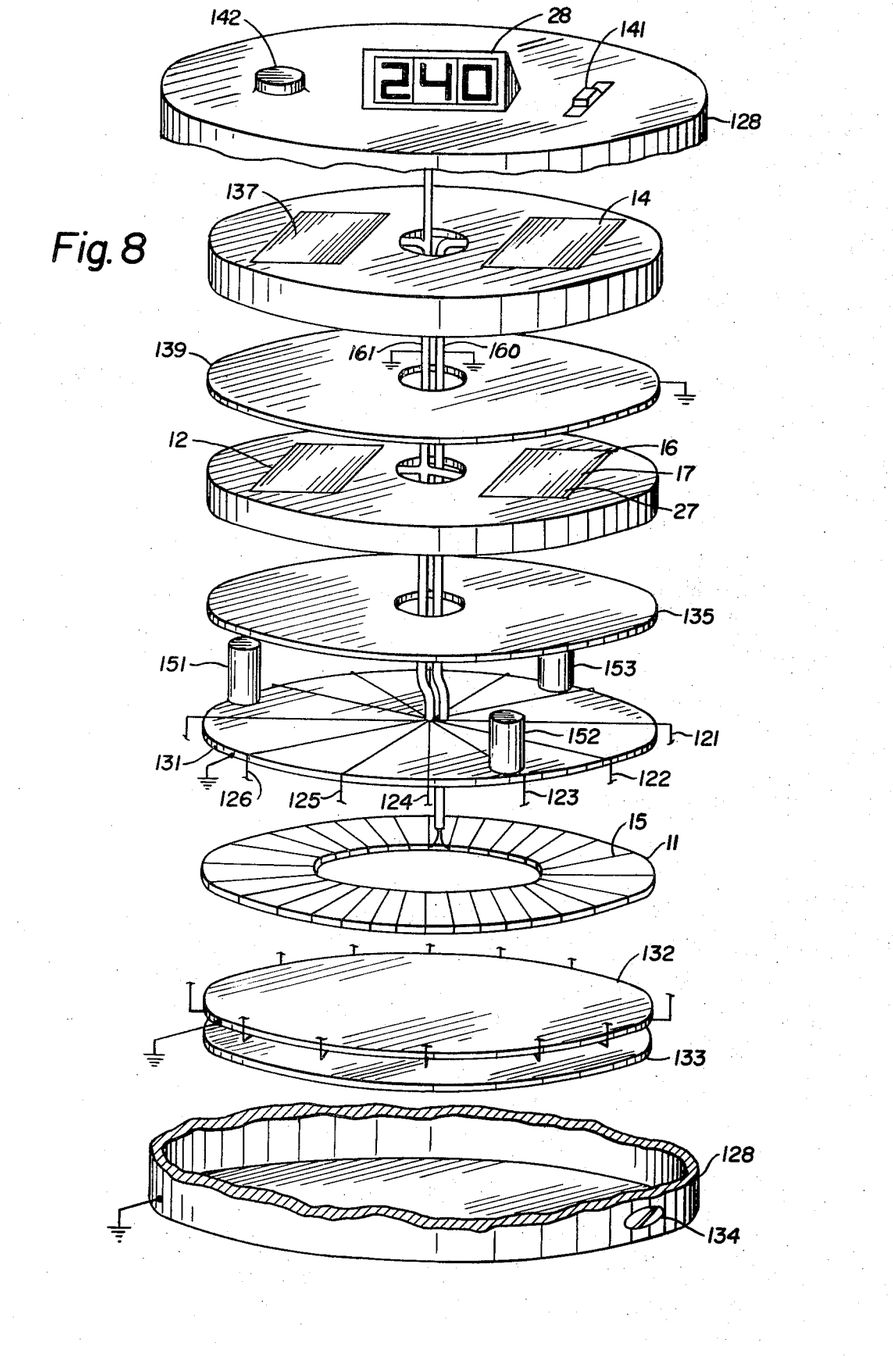
FIG. 8 shows an exploded view of a practical construction of the invention; and, FIG. 9 illustrates a variation of the apparatus shown in FIG. 1.

FIG. 8 illustrates one practical construction of the disclosed invention. The apparatus is contained within an electrically shielding housing 128 which is sectioned to illustrate an exploded view of the apparatus contained therein. The core means 11 is shown as an annulus of permalloy having the primary winding 15 wrapped therearound as a toroidal winding. The core means 11 is adjacent to two electrostatic shields 131 and 132 which are in close proximity to the core means 11 to isolate the adjacent sensing means 121–126 from capacitive signal coupling. These shields could be any conductor such as copper and the like. The bottom electrostatic shield 132 is connected to a support ring 133 which rests upon the bottom of the housing 128. A screw 134 is used to secure the bottom ring relative to the housing 128. The sensing means 121–126 are wrapped about the core means 11 in the type of winding arrangement illustrated in FIGS. 4, 5 and 6. The connections to the sensing means 121–126 and the primary winding 15 are passed through an electromagnetic shield 135 to the respective electronic circuitry. The electromagnetic shield 135 is spaced from the core means 15 by spacers 151–153 to avoid distortion of the magnetic flux sensed by the core means 15. The electromagnetic shield 135 can be Mu metal or the like. The conductors connecting the sensing means 121–126 and the winding 15 to the respective electronic circuits are shown as shielded by shielded cables 161 and 160, respectively. Immediately above the elctromagnetic shield 135 is the scanner means 12, the detector means 17, the memory means 16 and the averaging means 27. Immediately above an electrostatic shield 139, the RF generator 14 is situated with a power supply 137. The power supply can either be a battery or a voltage change circuit to enable the device to be operated from an external power source. The radio frequency generator 14 is isolated from the remaining circuitry by the electrostatic shield 139. The output of the averaging means 27 is applied to the indicator means 28 which is illustrated as a digital readout on top of the housing 128. The housing 128 has a switch 141 to control the power to the apparatus and a control device 142 to vary the averaging means 27.

The housing is secured to a vehicle or craft relative to an axis or reference direction thereof. The screw 134 is disengaged allowing the rotation of the bottom ring 133 and the constituents mounted thereon. This rotation allows an identifying means corresponding to the marker direction to be established relative to the vehicle or craft upon which the housing is mounted. The rotation can be accomplished electronically by reprogramming the memory means 16.

Figure 9:
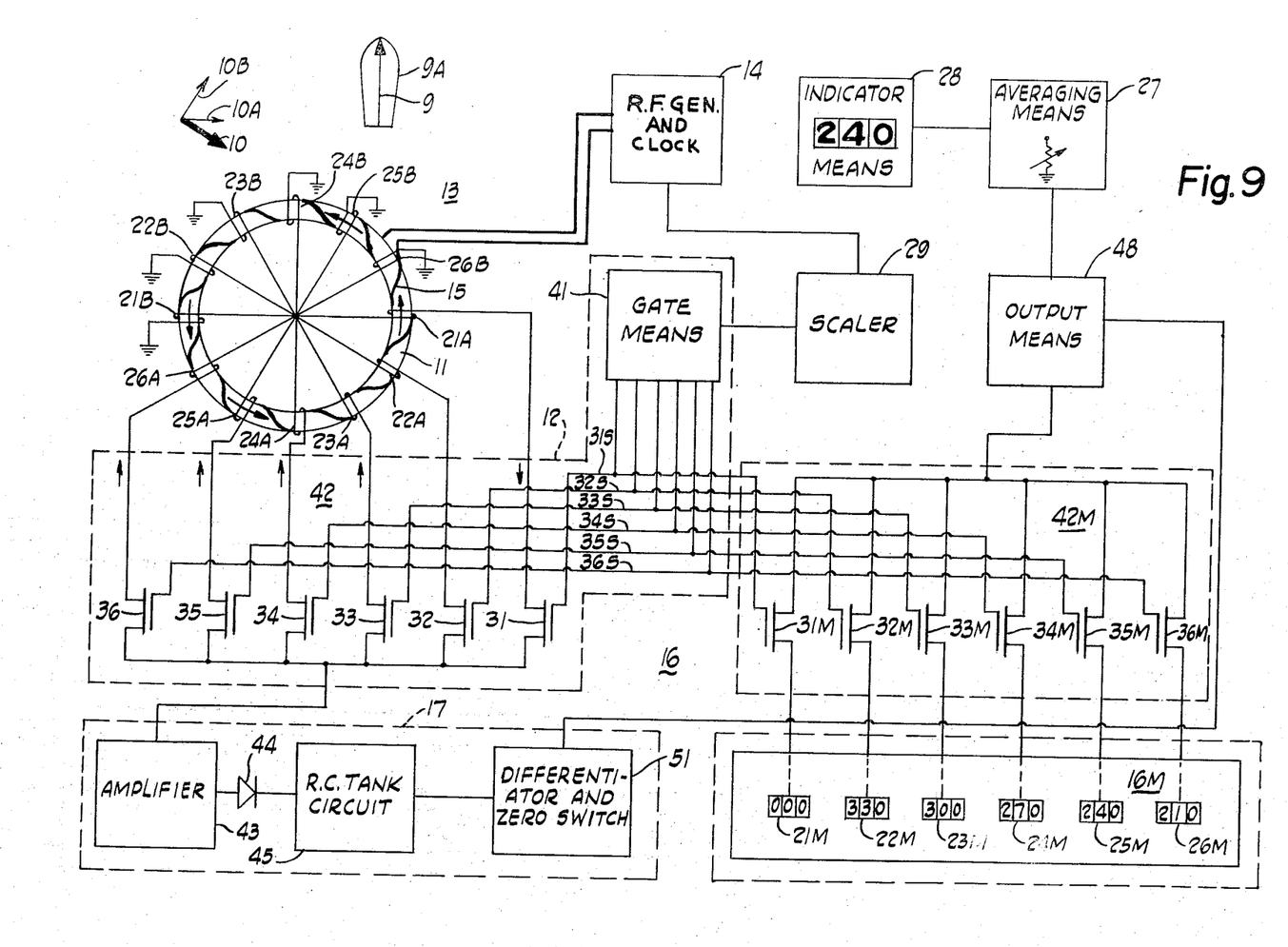

FIG. 9 illustrates a variation of the invention shown in FIG. 1. The distinction between the circuit shown in FIG. 9 and the shown in FIG. 1 is essentially in the type of memory means 16. The memory means 16 shown in FIG. 9 is not of the shift register memory type but is a fixed memory. This memory may be of the type commonly referred to as a Read Only Memory (ROM) or the like. The memory means 16 contains memory unit means 16M which includes six memory units 21M–26M. Each of these memory unit means 21M–26M is connected to an output means 48 through second switch means 42M. The second switch means is similar in nature to the first switch means 42 having corresponding switching devices 31M-36M. The signal of the detector means 17 is connected to the output means 48. In order for a signal to be transferred from the memory unit means 16M to the averaging means 27, one of the switching devices of the second switch means 42M must be gated on simultaneously with the output means 48. The output means 48 is gated on only upon signal from the detector means 17. The switch devices 31M-36M of the second switch means 42M are sequentially gated on by the gate means 41 in the same sequence as the switch devices 31-36 in the first switch means 42.

Assume, for example, the core means 11 and the sensing coil means 21-26 are located in a ship 9A with the marker direction being the axis 9 of the ship. If the external magnetic flux is in the direction shown by the arrow 10, then during the scanning sequence the signal output produced by sensing coil means 25 will produce the maximum output thereby gating on the output means 48. Simultaneously thereto switching device 35M will be in a conducting condition producing an output of 240° to the averaging means 27. If the external magnetic field is in the direction illustrated by arrow 10A, then sensing coil means 24 will produce the maximum output. The detector means 17 will gate the output means 48 into a conducting condition to allow the signal 270° to be transferred to the averaging means 27. If the external magnetic field is illustrated by the arrow 10B, then sensing coil 22 produces the maximum output. Under this condition the switching device 32M and the output means 48 will be in a simultaneous conduction state allowing the signal representative of 330° to be delivered into the averaging means 27.

FIGS. 1 and 9 have illustrated two particular types of memory means that are compatible for use with the invention. However, there are numerous other memory devices which are available for use with this invention. In addition, the sensing means to sense the external magnetic flux has been illustrated as a plurality of sensing coil means in conjunction with a magnetic core means. Nevertheless, any means to detect an external magnetic flux such as Hall effect devices and the like are within the contemplation of the sensor means to detect an external magnetic field. The invention includes the cooperation between a device for sensing an external magnetic field and a memory device and is not to be limited to a particular selection of a memory or sensor device.

Although the electronic stages and logic shown in FIGS. 1 and 9 and the physical construction illustrated in FIG. 8 have been described in a great degree of particularity, these descriptions have been included as an example of a particular application of the disclosed invention and are not to be construed as a limitation thereof. The function of the electronic stages shown in FIGS. 1, 7 and 9 can be reproduced by electronic circuits having a multitude of variations over those described, and such variations are considered to be within the scope and spirit of the disclosed invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus to detect the direction of an external magnetic flux relative to a marker direction, comprising in combination, sensor means for scanning the external magnetic flux for sensing a predetermined value of said external magnetic flux, memory means comprising a plurality of memory unit means for storing data, said data being representative of the angular directions of said sensor means relative to the marker direction, means for scanning said plurality of memory unit means in correlation with the scan of said sensor means, an output device for receiving data from said memory means, means connecting said sensor means and said memory means with said output device for transferring the angular direction data from said memory unit means to said output device upon said sensor means sensing said predetermined value of said external magnetic flux, and said connecting means including averaging means to control the response of said output device.

2. An apparatus as set forth in claim 1, wherein said output device is an automatic pilot.

3. An apparatus as set forth in claim 1, wherein said output device includes indicator means indicating the direction of the external magnetic flux relative to the marker direction.

4. An apparatus as set forth in claim 3, wherein said indicator means includes digital indicator means.

5. An apparatus as set forth in claim 1, wherein said averaging means is variable to vary the time average of the input to said indicator means.

6. An apparatus to detect the direction of an external magnetic flux relative to a marker direction, comprising in combination, magnetic core means located in the external magnetic flux, means establishing a magnetic flux in said core means, a plurality of sensing coil means located in unique directions relative to each other and magnetically coupled to said core means, detector means, scanner means including a plurality of switch means for sequentially connecting each of said plurality of sensing coil means to said detector means, memory means having a plurality of memory unit means respectively containing memory data representative of the respective angular direction of said sensing coil means relative to the marker direction, means for scanning said plurality of memory unit means in accordance with the connection sequence of said scanner means, said scanner means controlling said plurality of switch means to activate each of said sensing coil means, and means interconnecting said detector means and said memory means to obtain as an output from said memory means the representation of the direction of the external magnetic flux relative to the marker direction upon detecting a given value of the external magnetic flux.

7. An apparatus as set forth in claim 6, wherein said detector means includes means responsive to the rate of change of the outputs of said sensing coil means.

8. An apparatus as set forth in claim 6, including indicator means for numerically displaying a direction, and said interconnecting means connecting said detector means and said memory means with said indicator means for transferring the angular representation from said memory means to said indicator means to numerically display the direction of the external magnetic field relative to the marker direction.

9. An apparatus as set forth in claim 7, wherein said detector means includes differentiator means.

10. An apparatus as set forth in claim 6, wherein each of said sensing coil means includes first and second coil portion means.

11. An apparatus as set forth in claim 10, wherein each of said first and second coil portion means has a first and a second terminal, and said scanner means interconnects one of said terminals of each of said first and second coil portion means and connects the other of said terminals of each of said first and second coil portion means to said detector means and subsequently interconnects said other terminals of each of said first and second coil portion means and connects said one of said terminals of each of said first and second coil portion means to said detector means.

12. An apparatus as set forth in claim 10, wherein the apparatus has a number of sensing coil means equal to one half the number of directions to be scanned.

13. An apparatus as set forth in claim 10, wherein said scanner means connects said sensing coil means to said detector means and subsequently connects said sensing coil means to said detector means in an electrically inverted manner.

14. An apparatus as set forth in claim 6, wherein said scanner means applies each of the outputs of said sensing coil means to said detector means in a sequence.

15. An apparatus as set forth in claim 6, wherein said memory means is a shift register memory means.

16. An apparatus to detect the direction of an external magnetic flux relative to a marker direction, comprising in combination, magnetic core means located in the external magnetic flux, means establishing a magnetic flux in said core means, a plurality of sensing coil means located in unique directions relative to each other and magnetically coupled to said core means, detector means, scanner means including a first plurality of switch means connecting each of said plurality of sensing coil means to said detector means, memory means having a plurality of memory unit means each containing a representation of an angular direction of said unique directions of said sensing coil means relative to the marker direction, output means, a second plurality of switch means connecting each of said plurality of memory unit means to said output means, said scanner means controlling said first and second plurality of switch means to simultaneously interrogate each of said sensing coil means and corresponding memory unit means, and means interconnecting said detector means and said output means to obtain at said output means said angular direction representation from the respective interrogated memory unit means upon detection of a given value of the external magnetic flux.

17. An apparatus as set forth in claim 16, wherein said memory means is a read only memory means.

* * * * *